(12) United States Patent
Furuta

(10) Patent No.: US 12,472,791 B2
(45) Date of Patent: Nov. 18, 2025

(54) SUSPENSION CONTROL SYSTEM

(71) Applicant: TOYOTA JIDOSHA KABUSHIKI KAISHA, Toyota (JP)

(72) Inventor: Hiroki Furuta, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 27 days.

(21) Appl. No.: 18/678,288

(22) Filed: May 30, 2024

(65) Prior Publication Data

US 2025/0074129 A1   Mar. 6, 2025

(30) Foreign Application Priority Data

Sep. 4, 2023   (JP) .................................. 2023-143037

(51) Int. Cl.
*B60G 17/0165*   (2006.01)

(52) U.S. Cl.
CPC .... *B60G 17/0165* (2013.01); *B60G 2400/821* (2013.01); *B60G 2600/02* (2013.01)

(58) Field of Classification Search
CPC ................................................ B60G 17/0165
See application file for complete search history.

(56) References Cited

U.S. PATENT DOCUMENTS

| | | | | |
|---|---|---|---|---|
| 8,240,679 B2* | 8/2012 | Kajino | ...................... | F16F 9/14 280/5.515 |
| 11,097,587 B2* | 8/2021 | Toyohira | ................ | B60G 17/06 |
| 2009/0001679 A1* | 1/2009 | Kajino | ............... | B60G 21/0555 280/124.106 |
| 2011/0160960 A1* | 6/2011 | Kajino | ................. | B60G 17/025 701/38 |
| 2012/0290171 A1* | 11/2012 | Koumura | .............. | B60W 30/00 701/41 |
| 2014/0005889 A1* | 1/2014 | Hayakawa | ....... | B60G 17/01933 701/37 |
| 2014/0353934 A1* | 12/2014 | Yabumoto | ............ | B60G 17/018 280/5.515 |

(Continued)

FOREIGN PATENT DOCUMENTS

| | | |
|---|---|---|
| JP | 2022-024499 A | 2/2022 |
| JP | 2022-064361 A | 4/2022 |

(Continued)

*Primary Examiner* — Long T Tran
(74) *Attorney, Agent, or Firm* — SoraIP, Inc.

(57) ABSTRACT

A first acquisition unit acquires a road surface displacement-associated value related to up-down direction displacement of a road surface forward of a vehicle. A second acquisition unit acquires a state related to up-down direction displacement of a sprung structure or an unsprung structure of the vehicle. A deriving unit derives, in time series data of the road surface displacement-associated value or the state that is acquired, a ratio between a magnitude of a component of a first frequency band and a magnitude of a component of a second frequency band. A control unit executes feedforward control based on the road surface displacement-associated value that is acquired, and also executes feedback control based on the state that is acquired. A setting unit sets, when the derived ratio is no less than a threshold value, and also the feedforward control is not being appropriately executed, the feedback gain to be great.

5 Claims, 6 Drawing Sheets

(56) References Cited

U.S. PATENT DOCUMENTS

| | | | |
|---|---|---|---|
| 2015/0066295 A1* | 3/2015 | Kanda | B60G 17/01933 |
| | | | 701/38 |
| 2015/0290995 A1* | 10/2015 | Kanda | B60G 17/0182 |
| | | | 701/37 |
| 2020/0023705 A1* | 1/2020 | Hirao | B60G 17/0182 |
| 2022/0111695 A1 | 4/2022 | Furuta | |
| 2023/0017774 A1* | 1/2023 | Giovanardi | B60W 40/06 |
| 2023/0249714 A1* | 8/2023 | Shono | B60G 21/055 |
| | | | 701/23 |

FOREIGN PATENT DOCUMENTS

| | | |
|---|---|---|
| JP | 2023-047040 A | 4/2023 |
| JP | 2023-054955 A | 4/2023 |

* cited by examiner

SUSPENSION CONTROL SYSTEM

CROSS-REFERENCE TO RELATED APPLICATION

This application claims priority to Japanese Patent Application No. 2023-143037 filed on Sep. 4, 2023, incorporated herein by reference in its entirety.

BACKGROUND

1. Technical Field

The disclosure relates to a suspension control system.

2. Description of Related Art

Japanese Unexamined Patent Application Publication No. 2022-064361 (JP 2022-064361 A) discloses a damping control device for a vehicle. The damping control device executes preview damping control in which a road surface displacement-associated value at a predicted passing position is acquired as preview information based on measurement data, and in which a control force generation device is controlled based on a final target control force including a first target control force calculated using the preview information. The measurement data includes data in which a road surface displacement-associated value acquired when a measurement vehicle actually travels over the road surface is associated with position information representing the position at which the road surface displacement-associated value is acquired. The damping control device sets a magnitude of the first target control force to be small when determination is made that there is a high probability that a road surface state has changed from a point in time in the past.

SUMMARY

In a vehicle equipped with an active suspension that executes feedback control, such as a torsion bar active suspension for example, there are cases in which a wheel rate is set to be higher than normal. Also, a sprung structure can be damped by damping control of the active suspension and the sprung structure does not need to be damped by attenuation by an absorber, and accordingly there are cases in which an attenuation coefficient of the absorber is set to be lower than normal. Thus, when feedback gain of the feedback control is too small, vibrations may become excessively great. On the other hand, when the feedback gain is excessively great, vibrations in a low frequency band can be suppressed, but vibrations in a medium-to-high frequency band may become exacerbated.

Now, there is known an active suspension that executes both preview damping control and feedback control. In this configuration, in a situation in which input to the sprung structure can be sufficiently reduced by preview damping control, reducing the feedback gain when input of the medium-to-high frequency band, regarding which vibrations may become exacerbated due to feedback control, is relatively great, enables exacerbation of vibrations in the medium-to-high frequency band due to feedback control to be suppressed, substantially without adversely affecting vibrations in the low frequency band, which is advantageous.

However, in preview damping control, the likelihood is high that a road surface displacement-associated value for a predicted passing position acquired as preview information is not appropriate when the vehicle travels through a location where the road surface displacement-associated value of a map of measurement data is incorrect due to change in road surface conditions due to road construction or the like, or when the vehicle travels through a region where the road surface displacement-associated values in the map are spotty, or when precision of the predicted passing position is poor due to poor positioning precision of the vehicle, or the like. In this case, the input cannot be sufficiently reduced by preview damping control, and accordingly while exacerbation in vibrations in the medium-high frequency band can be suppressed by reducing the feedback gain when input in the medium-high frequency band is relatively great, there is a likelihood that vibrations in the low frequency band will becomes great. In view of such circumstances, appropriately adjusting the feedback gain is desirable.

An object of the disclosure is to provide a suspension control system capable of appropriately adjusting feedback gain.

In order to address the above issue, an aspect of the disclosure provides a suspension control system that includes an actuator that adjusts a suspension stroke of a control object wheel of a vehicle, and a control device for controlling the actuator. The control device includes a first acquisition unit that acquires a road surface displacement-associated value that is related to up-down direction displacement of a road surface forward of the vehicle, a second acquisition unit that acquires a state related to up-down direction displacement of a sprung structure or an unsprung structure of the vehicle, a deriving unit that derives, in time series data of the road surface displacement-associated value or the state that is acquired, a ratio between a magnitude of a component of a predetermined first frequency band and a magnitude of a component of a predetermined second frequency band that is higher than the first frequency band, a control unit that, by controlling the actuator, executes feedforward control for reducing vibrations of the sprung structure based on the road surface displacement-associated value that is acquired, and also executes feedback control for reducing vibrations of the sprung structure based on the state that is acquired, and a setting unit that, when the ratio that is derived is no lower than a threshold value, and also when the feedforward control is not being appropriately executed, sets feedback gain of the feedback control to be greater than when the feedforward control is being appropriately executed.

According to the disclosure, a suspension control system capable of appropriately adjusting feedback gain can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. In the description, the same elements are denoted by the same signs, and overlapping descriptions are omitted as appropriate.

1. Suspension and Road Surface Displacement-Associated Values

Figure 1:
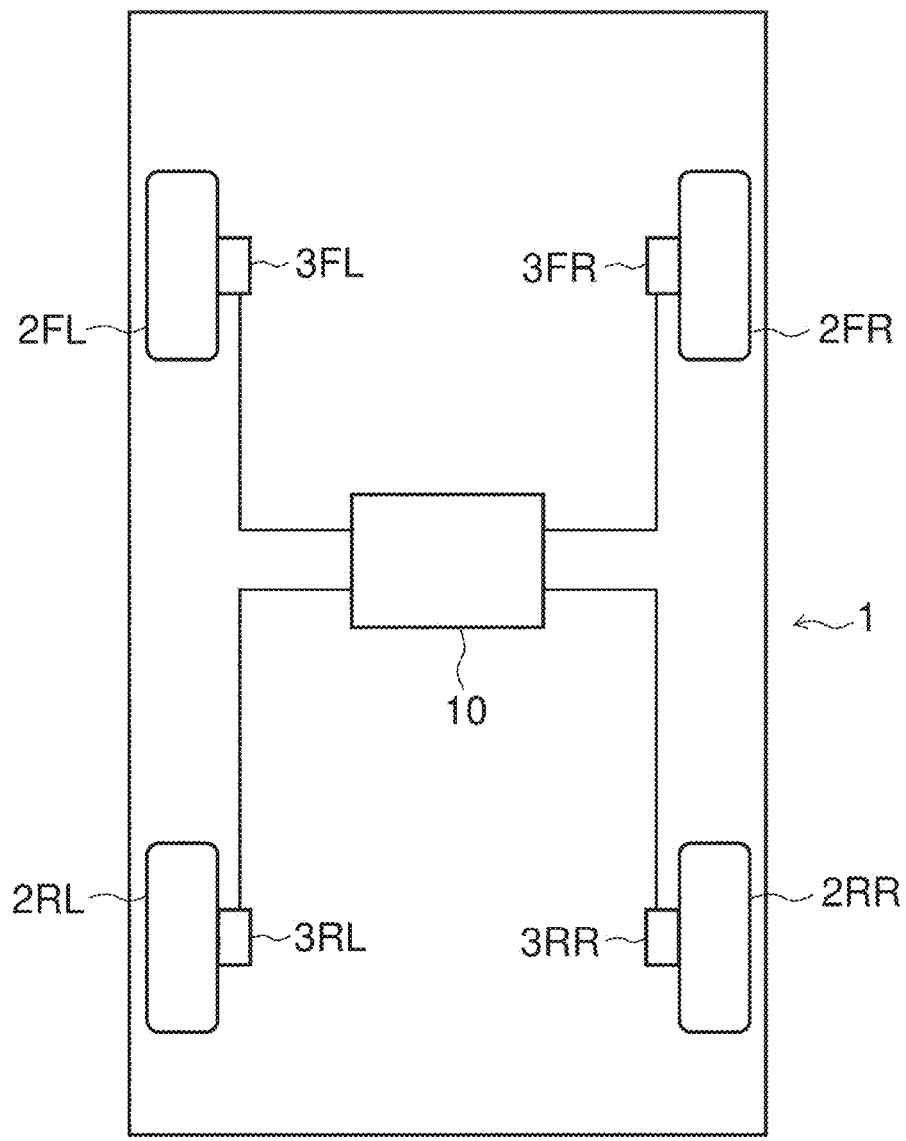
FIG. 1 is a diagram schematically illustrating a configuration of a vehicle according to an embodiment.

FIG. 1 schematically illustrates a configuration of a vehicle 1 according to an embodiment. Vehicle 1 is equipped with a left front wheel 2FL, right front wheel 2FR, left back wheel 2RL, right back wheel 2RR, suspension 3FL, suspension 3FR, suspension 3RL, suspension 3RR, and suspension control system 10. For each of the left front wheel 2FL, right front wheel 2FR, left back wheel 2RL, and right back wheel 2RR, corresponding items are provided among the suspension 3FL, suspension 3FR, suspension 3RL, and suspension 3RR. Hereinafter, when there is no need for particular distinction, each wheel is referred to as a wheel 2, and each suspension is referred to as a suspension 3.

Figure 2:
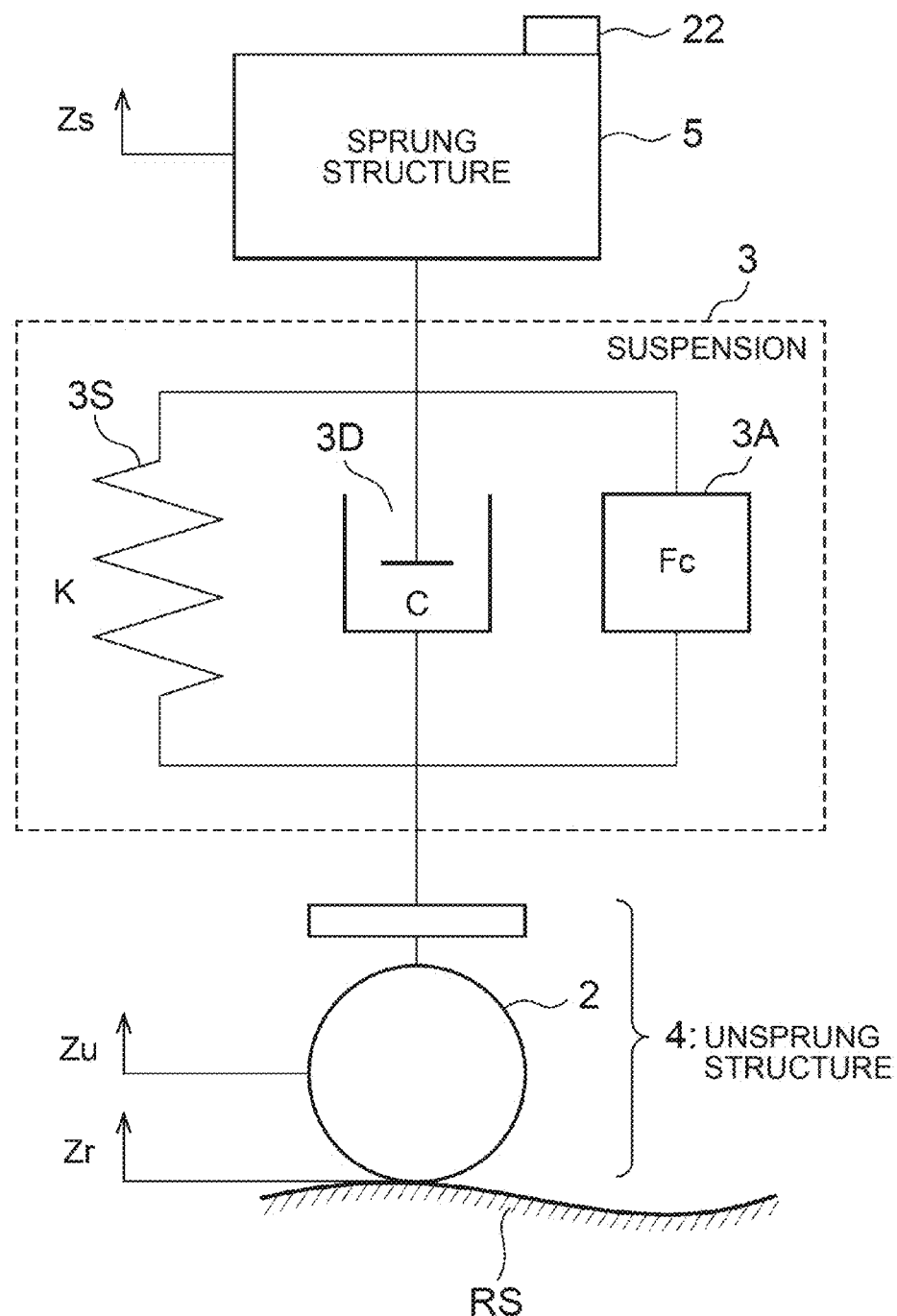
FIG. 2 schematically shows the configuration of the suspension of FIG. 1.

FIG. 2 schematically shows the configuration of the suspension 3 of FIG. 1. The suspension 3 is provided to connect between the unsprung structure 4 and the sprung structure 5 of the vehicle 1. The unsprung structure 4 includes wheels 2. The suspension 3 includes a spring 3S, a damper 3D, and an actuator 3A. The damper 3D is also referred to as a shock absorber. The spring 3S, the damper 3D, and the actuator 3A are provided in parallel between the unsprung structure 4 and the sprung structure 5. The actuator 3A controls the stroke of the suspension 3. The spring rate of the spring 3S is K. The attenuation coefficient of the damper 3D is C. The actuator 3A exerts an up-down direction control force Fc between the unsprung structure 4 and the sprung structure 5, thereby adjusting the stroke of the suspension 3.

More specifically, the actuator 3A is, for example, an electric or hydraulic active actuator, which constitutes a so-called full active suspension. Alternatively, the actuator 3A may be, for example, an actuator that varies the attenuation force generated by the damper 3D, or an actuator of an active stabilizer device. Further, the "actuator" of the present disclosure may be, for example, an actuator such as an electric motor that generates a vehicle longitudinal force in a vehicle including a suspension configured to convert a driving force and a braking force, which are vehicle longitudinal forces acting on wheels, into a control force Fc by using a suspension geometry. The electric motor may be, for example, an in-wheel motor (IWM) provided on a wheel, or may be an electric motor capable of driving a wheel via a vehicle drive shaft.

Here, the term is defined. The "road surface displacement Zr" is an up-down direction displacement of the road surface RS. The "unsprung displacement Zu" is the up-down direction displacement of the unsprung structure 4. The "sprung displacement Zs" is an up-down direction displacement of the sprung structure 5. The "unsprung speed Zu'" is the up-down direction speed of the unsprung structure 4. The "sprung speed Zs'" is the up-down direction speed of the sprung structure 5. The "unsprung acceleration Zu''" is the up-down direction acceleration of the unsprung structure 4. The "sprung acceleration Zs''" is the up-down direction acceleration of the sprung structure 5. Note that the sign of each parameter is positive in the case of the upward direction and negative in the case of the downward direction.

The wheels 2 move on the road surface RS. Hereinafter, a value related to the road surface displacement Zr is referred to as a "road surface displacement-associated value". Examples of the road surface displacement-associated value include a road surface displacement Zr, a road surface displacement speed Zr' which is a time-differential value of the road surface displacement Zr, an unsprung displacement Zu, an unsprung speed Zu', an unsprung acceleration Zu'', a sprung displacement Zs, a sprung speed Zs', and a sprung acceleration Zs''. The road surface displacement-associated value may also be referred to as an "up-down direction motion parameter" which is a parameter related to the up-down direction motion of the wheel 2.

In the following, an example in which the road surface displacement-associated value is the unsprung displacement Zu will be described. In the case of generalization, "unsprung displacement" in the following description is read as "road surface displacement-associated value".

Here, an example of the unsprung displacement calculation process will be described. First, the sprung acceleration Zs'' is detected by the sprung acceleration sensor 22 installed in the sprung structure 5. Next, the sprung displacement Zs is calculated by integrating the sprung acceleration Zs'' on the second floor.

Next, a stroke ST is acquired, which is the relative displacement between the sprung structure 5 and the unsprung structure 4. "Stroke ST"="sprung displacement Zs'"—"unsprung displacement Zu". For example, the stroke ST is detected by a stroke sensor installed in the suspension 3. As another example, the stroke ST may be estimated based on the sprung acceleration Zs'' by an observer configured based on a single-wheel two-degree-of-freedom model.

Next, in order to suppress the effect of sensor drifting or the like, the time series data of the sprung displacement Zs is filtered. Similarly, the time series data of the stroke ST is filtered. For example, the filter is a band-pass filter that passes signal components in a specific frequency band. The specific frequency band may be set to include the sprung resonance frequency of the vehicle 1. For example, the specific frequency band is 0.3 Hz to 10 Hz.

Next, the difference between the sprung displacement Zs and the stroke ST is calculated as the unsprung displacement Zu.

Instead of performing the filtering process on the time series data of the sprung displacement Zs and the stroke ST, the filtering process may be performed on the time series data of the calculated unsprung displacement Zu.

As yet another example, the unsprung acceleration Zu'' may be detected by the unsprung acceleration sensor, and the unsprung displacement Zu may be calculated from the unsprung acceleration Zu''.

2. Suspension Control System

Figure 3:
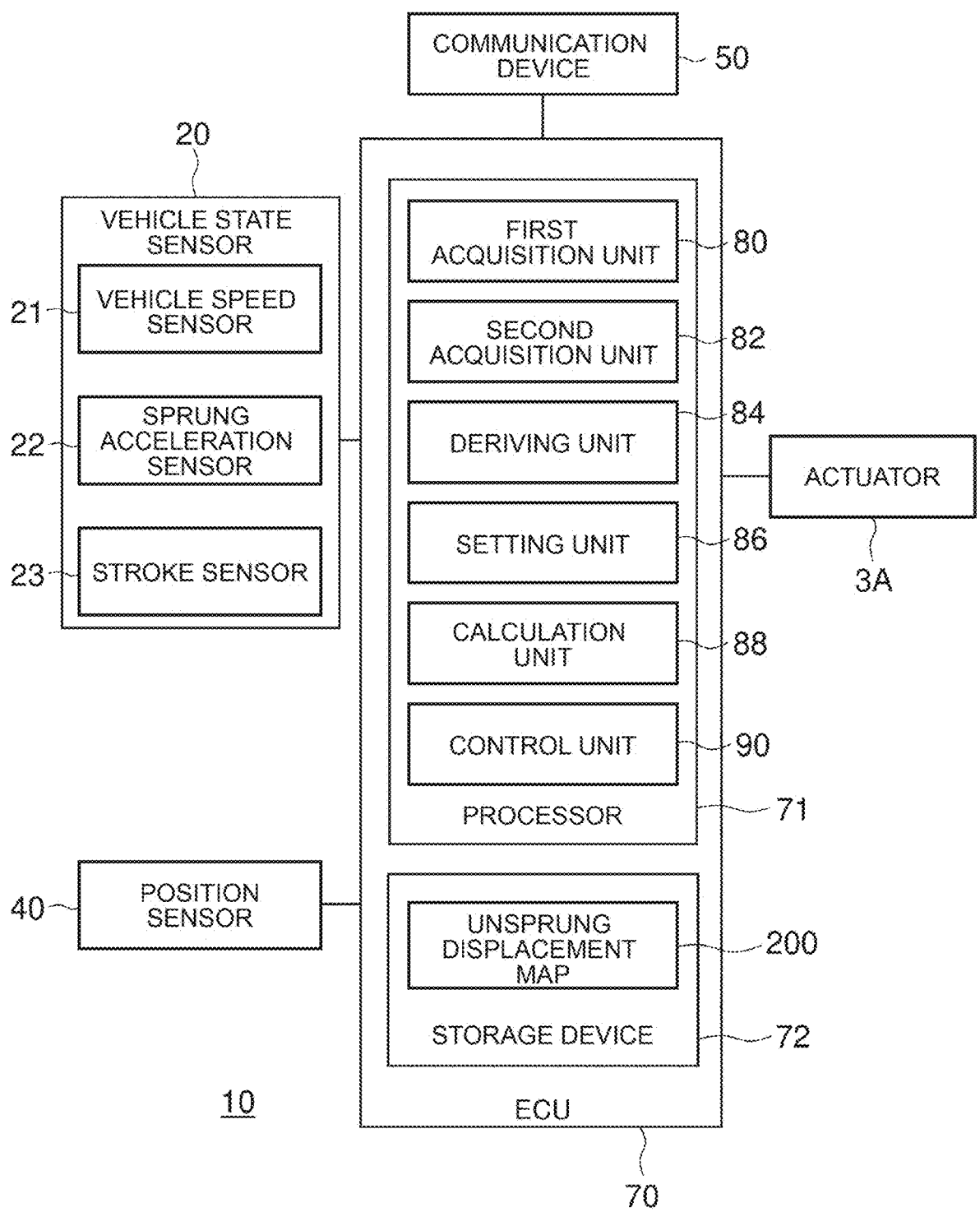
FIG. 3 is a block diagram illustrating a configuration example of the suspension control system according to the embodiment.

FIG. 3 is a block diagram illustrating a configuration example of the suspension control system 10 according to the embodiment. The suspension control system 10 is mounted on the vehicle 1. The suspension control system 10 includes a vehicle state sensor 20, a position sensor 40, a communication device 50, an actuator 3A, and an ECU 70. ECU 70 is an electronic control unit.

The vehicle state sensor 20 detects the state of the vehicle 1 and supplies the detected state to ECU 70. The vehicle state sensor 20 includes a vehicle speed sensor 21 for detecting the vehicle speed V of the vehicle 1, a sprung acceleration sensor 22 for detecting the sprung acceleration Zs", and a stroke sensor 23 for detecting the stroke ST. The vehicle state sensor 20 may include an unsprung acceleration sensor. The vehicle state sensor 20 may include a lateral acceleration sensor, a yaw rate sensor, a steering angle sensor, and the like.

The position sensor 40 detects the position and the azimuth of the vehicle 1 and supplies the detected position information to ECU 70. For example, the position sensor 40 includes a GNSS (Global Navigation Satellite System) receiver.

The communication device 50 communicates with the outside of the vehicle 1.

ECU 70 is a computer that controls the vehicle 1. ECU 70 includes a processor 71 and a storage device 72. The processor 71 executes various processes. For example, the processor 71 includes a CPU (Central Processing Unit). The storage device 72 stores various kinds of information necessary for processing by the processor 71. Examples of the storage device 72 include volatile memory, non-volatile memory, HDD (Hard Disk Drive), SSD (Solid State Drive), and the like.

The processor 71 includes a first acquisition unit 80, a second acquisition unit 82, a deriving unit 84, a setting unit 86, a calculation unit 88, and a control unit 90. When the processor 71 executes the suspension control program stored in the storage device 72, the functions of the first acquisition unit 80, the second acquisition unit 82, the deriving unit 84, the setting unit 86, the calculation unit 88, and the control unit 90 are realized. The suspension control program may be recorded in a computer-readable recording medium. ECU 70 corresponds to an exemplary "control device" of the present disclosure.

The storage device 72 stores an unsprung displacement map 200. Details of the unsprung displacement map 200 will be described later.

ECU 70 controls the suspension 3 by controlling the actuator 3A. Specifically, ECU 70 controls the suspension 3 to perform vibration damping control for suppressing vibrations of the vehicle 1. ECU 70 controls the actuator 3A to generate an up-down direction control force Fc between the unsprung structure 4 and the sprung structure 5, as shown in FIG. 2. The damping control includes "preview control" and "feedback control" described later. Preview control may also be referred to as feedforward control. Details of the damping control will be described later.

3. Map Management Device

3-1. Configuration Example

Figure 4:
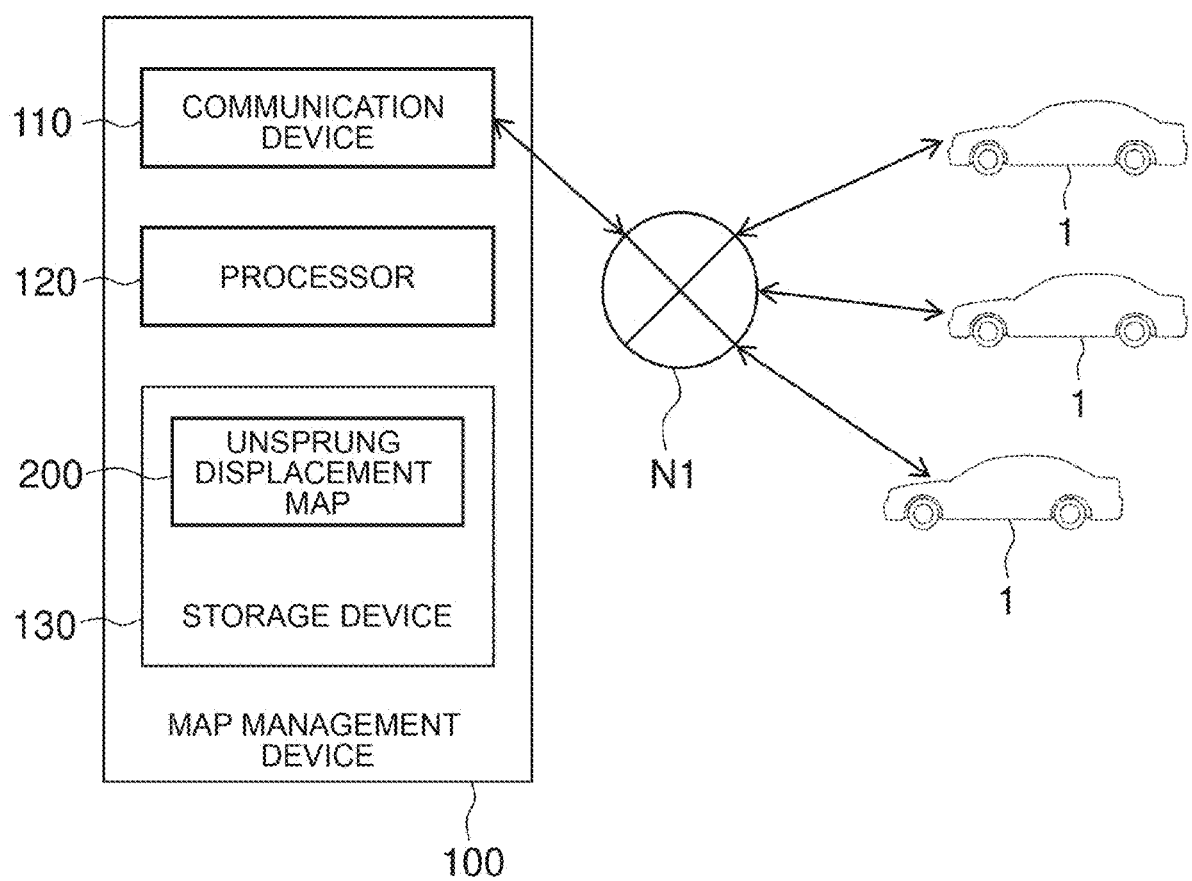
FIG. 4 is a block diagram illustrating a configuration example of the map management device according to the embodiment.

FIG. 4 is a block diagram illustrating a configuration example of the map management device 100 according to the embodiment. The map management device 100 is a computer that manages various types of map information. Managing the map information includes generating, updating, providing, and distributing the map information. Typically, the map management device 100 is a management server on the cloud. The map management device 100 may be a distributed system in which a plurality of servers performs distributed processing.

The map management device 100 includes a communication device 110. The communication device 110 is connected to a communication networking N1. For example, the communication device 110 communicates with a large number of vehicles 1 via a communication networking N1.

The map management device 100 further includes a processor 120 and a storage device 130. The processor 120 executes various types of information processing. For example, the processor 120 includes a CPU. The storage device 130 stores various types of map information. The storage device 130 stores various kinds of information necessary for processing by the processor 120. Examples of the storage device 130 include a volatile memory, a non-volatile memory, an HDD, and an SSD.

The map management program is a computer program for map management, and is executed by the processor 120. The map management program is stored in the storage device 130. Alternatively, the map management program may be recorded in a computer-readable recording medium. When the processor 120 executes the map management program, the function of the map management device 100 is realized.

The processor 120 communicates with the suspension control system 10 of the vehicle 1 via the communication device 110. The processor 120 collects various types of information from the suspension control system 10, and generates and updates map information based on the collected information. The processor 120 distributes the map information to the suspension control system 10. The processor 120 provides map information in response to a request from the suspension control system 10.

3-2. Unsprung Displacement Map

One of the pieces of the map information managed by the map management device 100 is an unsprung displacement map 200. The unsprung displacement map 200 is a map of unsprung displacement Zu, which is a road surface displacement-associated value. The unsprung displacement map 200 is stored in the storage device 130. The unsprung displacement map 200 corresponds to an example of "a road surface data map in which a road surface displacement-associated value and a position related to up-down direction displacement of a road surface are associated" of the present disclosure.

The unsprung displacement map 200 represents the correspondence between the position (X, Y) and the unsprung displacement Zu in XY plane. In other words, the unsprung displacement map represents the unsprung displacement Zu as a function of position (X, Y). XY plane represents a horizontal plane. For example, an absolute coordinate system in a horizontal plane is defined by a latitude direction and a longitude direction, and a position is defined by a latitude and a longitude.

The road area may be partitioned into meshes on a horizontal plane. That is, the road area may be divided into a plurality of unit areas (hereinafter, referred to as "road surface sections") on the horizontal plane. The road surface section is, for example, square. The length of one side of the square is, for example, 10 cm. The unsprung displacement map 200 represents a correspondence between the position of the road surface section and the unsprung displacement Zu. The position of the road surface section may be defined by a representative position of the road surface section, for example, a center position, or may be defined by a latitude range and a longitude range of the road surface section. The unsprung displacement Zu of the road surface section is, for example, the mean of the unsprung displacement Zu acquired in the road surface section. The smaller the road surface segment, the greater the resolution of the unsprung displacement map 200.

3-3. Map Generation and Update Processing

The processor 120 collects information from a large number of vehicles 1 via the communication device 110. Then, the processor 120 generates and updates the unsprung displacement map 200 based on the information collected from the plurality of vehicles 1.

The position in the unsprung displacement map 200 is a position where the wheel 2 has passed. The position of each wheel 2 is calculated based on the position information detected by the position sensor 40. Specifically, the relative positional relationship between the reference point of the vehicle position in the vehicle 1 and each wheel 2 is known information. The position of each wheel 2 can be calculated based on the relative positional relationship and the vehicle position indicated by the positional information.

The unsprung displacement Zu is calculated by the above-described methods. That is, by using the vehicle state sensor 20 mounted on the vehicle 1, the sprung displacement Zs and the stroke ST can be obtained. These sprung displacement Zs and stroke ST are referred to as "sensor-based information" for convenience. The unsprung displacement Zu is calculated based on the sensor-based information.

For example, during traveling of the vehicle 1, ECU 70 of the suspension control system 10 calculates the unsprung displacement Zu in real time based on the sensor-based information. ECU 70 also associates the same-timed wheel position with the unsprung displacement Zu. Then, ECU 70 transmits a set of time series data of the wheel position and time series data of the unsprung displacement Zu to the map management device 100. The processor 120 of the map management device 100 generates and updates the unsprung displacement map based on the time series data of the wheel position and the time series data of the unsprung displacement Zu.

Alternatively, ECU 70 of the suspension control system 10 associates the same-timed wheel position with the sensor-based data. Then, ECU 70 transmits a set of time series data of the wheel position and time series data of the sensor base information to the map management device 100. The processor 120 of the map management device 100 calculates the unsprung displacement Zu based on the received sensor-based data. Further, the processor 120 generates and updates the unsprung displacement map based on the time series data of the wheel position and the time series data of the unsprung displacement Zu.

The processor 120 of the map management device 100 acquires map update information from the suspension control system 10 of the vehicle 1 via the communication device 110. The map update information includes time series data of the wheel position, which is the position of the vehicle 1. The map updating information includes time series data of sensor-based information required for calculating the unsprung displacement Zu. Alternatively, the map updating data may include time series data of the unsprung displacement Zu calculated by ECU 70 of the suspension control system 10.

The processor 120 of the map management device 100 generates and updates the unsprung displacement map 200 based on the map update information.

The suspension control system 10 of the vehicle 1 may hold the database of the unsprung displacement map 200 and generate and update its unsprung displacement map 200.

That is, the map management device 100 may be included in the suspension control system 10.

4. Preview Control Using Unsprung Displacement Map and Feedback Control

ECU 70 of the suspension control system 10 communicates with the map management device 100 via the communication device 50. ECU 70 acquires an unsprung displacement map 200 of the area including the current position of the vehicle 1 from the map management device 100. The unsprung displacement map 200 is stored in the storage device 72. Then, ECU 70 executes preview control, which is a kind of damping control, based on the unsprung displacement map 200. Preview control is performed to reduce vibration of the sprung structure 5. ECU 70 also performs the feedback control based on the detected values of the sprung acceleration sensor 22 and the stroke sensor 23 together with the preview control. Feedback control is also performed to reduce vibration of the sprung structure 5.

The first acquisition unit 80, the second acquisition unit 82, the deriving unit 84, the setting unit 86, the calculation unit 88, and the control unit 90 repeatedly execute the following processing for each of the four control object wheels at each time step.

First, preview control will be described. The first acquisition unit 80 acquires the current position of each wheel 2. The relative positional relationship between the reference point of the vehicle position in the vehicle 1 and each wheel 2 is known information. The position of each wheel 2 can be calculated based on the relative positional relationship and the vehicle position indicated by the positional information.

The first acquisition unit 80 calculates the predicted passing position Pf of the wheel 2 after the preview-time tp from the present time. The preview time tp is a predetermined time. The preview time tp is set in advance to be, for example, a time required for the actuator 3A of the suspension 3 to output the control force Fc corresponding to the target control force Fc_t after the first acquisition unit 80 identifies the predicted passing position Pf. The preview distance Lp is given by the product of the preview time tp and the vehicle speed V. The predicted passing position Pf is a position ahead of the vehicle-traveling direction by a preview-distance Lp from the current position along the predicted moving course in which the wheel 2 is predicted to move. The predicted travel path can be identified, for example, based on the traveling direction of the vehicle 1 and the current position P0 of the wheel 2. The traveling direction can be identified by, for example, the following method. That is, the first acquisition unit 80 maps the current position P0 of the previous time step and the current position P0 of the current time step to the map information, and identifies the direction from the current position of the previous time step to the current position P0 of the current time step as the traveling direction. As a modification, the first acquisition unit 80 may calculate the predicted traveling route based on the vehicle speed V and the steering angle of the wheel 2, and may calculate the predicted passing position Pf based on the predicted traveling route.

The first acquisition unit 80 acquires the calculated unsprung displacement Zu in the predicted passing position Pf by reading it from the unsprung displacement map 200.

The calculation unit 88 calculates the target control force related to the preview control of the actuator 3A of the suspension 3 based on the unsprung displacement Zu in the predicted passing position Pf acquired by the first acquisition unit 80. The target control force related to the preview control is calculated using, for example, the following Expression (3) or Expression (4).

The equation of motion for the sprung structure 5 of FIG. 2 is represented by the following Expression (1).

$$m \cdot Zs'' = C(Zu' - Zs') + K(Zu - Zs) - Fc \qquad (1)$$

In Expression (1), m is the mass of the sprung structure 5, C is the attenuation coefficient of the damper 3D, K is the spring constant of the spring 3S, and Fc is the up-down direction control force generated by the actuator 3A. If the control force Fc completely cancels the vibration of the sprung structure 5, then $Zs''=0$, $Zs'=0$, $Zs=0$, and the control force Fc is expressed by the following Expression (2).

$$Fc = C \cdot Zu' + K \cdot Zu \qquad (2)$$

The control force Fc providing at least the damping effect is expressed by the following Expression (3).

$$Fc = \alpha \cdot C \cdot Zu' + \beta \cdot K \cdot Zu \qquad (3)$$

In Expression (3), the control gain $\alpha$ is greater than 0 and less than or equal to 1, and the control gain $\beta$ is also greater than 0 and less than or equal to 1. When the differential term in Expression (3) is omitted, the control force Fc that provides at least the damping effect is expressed by the following Expression (4).

$$Fc = \beta \cdot K \cdot Zu \qquad (4)$$

Next, the feedback control executed simultaneously with the preview control will be described. The second acquisition unit 82 acquires a state related to the up-down direction displacement of the sprung structure 5 or the unsprung structure 4 of the vehicle 1 from the vehicle state sensor 20 installed in the vehicle 1. Any of a sprung displacement Zs, a sprung velocity Zs', a sprung acceleration Zs'', an unsprung displacement Zu, an unsprung velocity Zu', and an unsprung acceleration Zu'' may be used as the state. In the following, the state is an unsprung velocity Zu'. In the case of generalization, "unsprung speed" in the following description shall be read as "state".

When the unsprung speed Zu' is used, the second acquisition unit 82 can calculate the unsprung speed Zu' by subtracting the "sprung speed Zs'—unsprung speed Zu'", which is the first-order differential value of the stroke ST detected by the stroke sensor 23, from the sprung speed Zs', which is the first-order integral value of the sprung acceleration Zs'' detected by the sprung acceleration sensor 22.

By controlling the actuator 3A, the control unit 90 executes the following feedback control as the damping control based on the unsprung velocity Zu' acquired by the second acquisition unit 82 in addition to the preview control described above. The control force Fc when the preview control is performed with the feedback control is expressed by the following Expression (5), for example. In this example, the calculation unit 88 calculates the target control force Fc_t related to the preview control accompanied by the feedback control according to Expression (5).

$$Fc = \beta \cdot K \cdot Zu + \gamma \cdot Zu' \qquad (5)$$

The first term on the right side of Expression (5) is the same as Expression (4), and is a feedforward term related to preview control. The first term on the right side may be the same as the above Expression (3). The second term on the right side is a feedback term related to feedback control. This feedback term is the product of the feedback gain $\gamma$ and the unsprung velocity Zu' at the time of calculation of the target control force Fc_t, for example.

The calculation unit 88 calculates the target control force Fc_t related to the preview control accompanied by the feedback control in accordance with the above-described Expression (5). That is, the calculation unit 88 calculates the target control force Fc_t by substituting the unsprung displacement Zu at the predicted passing position Pf and the unsprung velocity Zu' at the time of calculation of the target control force Fc_t into Expression (5). The target control force Fc_t corresponds to a required value of the control force Fc required for the preview control and the feedback control.

In the embodiment, the feedback gain $\gamma$ of the above Expression (5) is one of the features to be set as follows.

The deriving unit 84 derives the degree of reliability of the unsprung displacement Zu of the predicted passing position Pf acquired by the first acquisition unit 80. For example, known techniques such as the following derivation method can be used to derive the degree of reliability.

For example, as the first derivation method, the deriving unit 84 may derive the degree of reliability of the unsprung displacement Zu of the predicted passing position Pf higher as the difference between the unsprung displacement Zu of the current passing position of the wheel 2 of the vehicle 1 acquired from the unsprung displacement map 200 and the unsprung displacement Zu of the current passing position of the wheel 2 derived based on the detected values of the sprung acceleration sensor 22 and the stroke sensor 23 is smaller. The higher the degree of reliability of the unsprung displacement Zu of the predicted passing position Pf, the higher the degree of reliability of the unsprung displacement map 200. For example, when the road surface condition changes due to road construction or the like after the unsprung displacement map 200 is created, the degree of reliability of the unsprung displacement Zu of the predicted passing position Pf becomes low. Since the first derivation method is disclosed in JP 2022-064361 A and Japanese Unexamined Patent Application Publication No. 2023-047040 (JP 2023-047040 A), further detailed description thereof will be omitted.

Further, as a second derivation method, the deriving unit 84 may convert the unsprung displacement Zu of the predicted passing position Pf acquired by the first acquisition unit 80 into the road surface displacement, and may derive the degree of reliability of the unsprung displacement Zu of the predicted passing position Pf higher as the difference between the road surface displacement and the road surface displacement of the predicted passing position Pf acquired by a known preview sensor (not shown) is smaller. The higher the degree of reliability of the unsprung displacement Zu of the predicted passing position Pf, the higher the degree of reliability of the unsprung displacement map 200. The second derivation method is disclosed in Japanese Unexamined Patent Application Publication No. 2022-024499 (JP 2022-024499 A), and thus further detailed description thereof will be omitted.

As a third derivation method, the deriving unit 84 may derive the degree of reliability of the position information of the vehicle 1 detected by the position sensor 40, and may derive the degree of reliability of the unsprung displacement Zu of the predicted passing position Pf higher as the degree of reliability of the position information is higher. The degree of reliability of the position information may be set as the degree of reliability of the unsprung displacement Zu of the predicted passing position Pf. The degree of reliability of the position information is an index value indicating the accuracy and certainty of the position, and the higher the accuracy and certainty, the larger the value. Since the third derivation method is disclosed in Japanese Unexamined Patent Application Publication No. 2023-054955 (JP 2023-054955 A), a detailed description thereof will be omitted.

When the degree of reliability of the unsprung displacement Zu of the derived predicted passing position Pf is higher than the reference value, the deriving unit 84 derives a ratio between the magnitude of the component of the predetermined first frequency band and the magnitude of the component of the predetermined second frequency band in the time series data of the unsprung displacement Zu. This percentage is also the ratio of the size of the component in the second frequency band to the size of the component in the first frequency band. This ratio can also be called the input ratio. The reference value can be appropriately determined by experiment or simulation.

The first frequency band is a frequency band in which the vibration of the sprung structure 5 is suppressed by feedback control, and is, for example, a low frequency band of 1 Hz to 2 Hz. The second frequency band is a frequency band in which vibrations of the sprung structure 5 deteriorate due to feedback control, and is, for example, a medium and high frequency band in a range from 3 Hz to 8 Hz. The second frequency band is higher than the first frequency band.

Since the unsprung displacement Zu of the predicted passing position Pf is degree of reliability highly, the ratio of the components of the second frequency band to the first frequency band for determining whether to lower the feedback gain γ is derived from the data of the unsprung displacement map 200.

For example, the deriving unit 84 compares FFT (Fast Fourier Transformation) of each of the first frequency band and the second frequency band in the time series data of the unsprung displacement Zu, and derives an input ratio of the component of the first frequency band and the component of the second frequency band. Alternatively, the deriving unit 84 may apply a band-pass filter of each band of the first frequency band and the second frequency band to the time series data of the unsprung displacement Zu to acquire a peak value within a specified time from the output signal of the band-pass filter, acquire a moving average value, or acquire a value to which a low-pass filter corresponding to a moving average is applied, and derive an input ratio of the component of the first frequency band and the component of the second frequency band from the acquired value. The ratio of the component of the second frequency band to the component of the first frequency band may be derived using other known techniques.

In order to derive the ratio of the component of the second frequency band to the component of the first frequency band, any kind of the road surface displacement-associated value described above can be used. For example, any type can be used as long as it is a state that can be known as input, such as road surface displacement Zr, road surface displacement speed Zr', road surface displacement acceleration Zr", unsprung displacement Zu, unsprung speed Zu', unsprung acceleration Zu", sprung displacement Zs, sprung speed Zs', or sprung acceleration Zs". For example, when the unsprung speed Zu' is used, the input to the suspension 3 is directly known, and the road surface amplitude has a 1/f characteristic with respect to the frequency, that is, for a common road surface characteristic that the road surface amplitude becomes ⅟₁₀ when the frequency is 10 times, FFT characteristic has a flat characteristic with respect to the frequency, and it is easy to compare the relative magnitudes of the input of the first frequency band and the input of the second frequency band because any frequency band has the same level.

Note that the target control is feedback control based on the sprung state or the unsprung state, and may be any control as long as the first frequency band and the second frequency band can be grasped. For example, the most common sprung skyhook damper control, which provides a control force proportional to sprung speed, shows damping effects and vibration deterioration in two frequency bands in the frequency range described above.

When the degree of reliability of the unsprung displacement Zu of the predicted passing position Pf is equal to or less than the reference value, the deriving unit 84 derives a ratio between the magnitude of the component of the first frequency band and the magnitude of the component of the second frequency band in the time series data of the unsprung velocity Zu' acquired by the second acquisition unit 82.

Since the degree of reliability of the unsprung displacement Zu of the predicted passing position Pf is low, there is a possibility of erroneous determination when the unsprung displacement map 200 is used, and the ratio for determination is derived using the unsprung velocity Zu' based on the detected values detected by the sprung acceleration sensor 22 and the stroke sensor 23. The method of deriving the ratio is the same as that described above.

In order to derive the ratio of the component of the second frequency band to the component of the first frequency band, in place of the unsprung speed Zu', any type of unsprung displacement Zu, unsprung acceleration Zu", or the like, which is the state described above, can be used as long as the state in which the input is known or the state in which the response on the spring is known, such as the sprung displacement Zs, the sprung speed Zs', or the sprung acceleration Zs" is known.

As described above, for example, by using the unsprung velocity Zu', the input to the suspension 3 is directly known, and the relative magnitudes of the input of the first frequency band and the input of the second frequency band are easily compared with each other.

As described above, the deriving unit 84 derives the ratio between the magnitude of the component of the first frequency band and the magnitude of the component of the second frequency band in the unsprung displacement Zu acquired by the first acquisition unit 80 or the time series data of the unsprung velocity Zu' acquired by the second acquisition unit 82.

When the unsprung displacement Zu acquired by the first acquisition unit 80 is appropriate or when the degree of reliability of the unsprung displacement Zu is higher than the reference value, the setting unit 86 identifies that the preview control is appropriately executed. The proper execution of the preview control indicates that the damping effect of the preview control is relatively high. When the acquired unsprung displacement Zu is appropriate and the degree of reliability of the unsprung displacement Zu is higher than the reference value, the setting unit 86 may identify that the preview control is appropriately executed.

When the unsprung displacement Zu acquired by the first acquisition unit 80 is not appropriate, or when the degree of reliability of the unsprung displacement Zu is equal to or less than the reference value, the setting unit 86 identifies that the preview control is not appropriately executed. The fact that the preview control is not properly executed indicates that the damping effect of the preview control is relatively low.

In other words, when the degree of reliability of the unsprung displacement Zu is equal to or lower than the reference value, it is highly likely that the damping effect of the preview control is low, and therefore, the setting unit 86 determines that the preview control is not appropriately executed. When the degree of reliability of the unsprung displacement Zu is equal to or lower than the reference value, the calculation unit 88 may decrease the control gain α and the control gain R of the preview control. In this case as well, since the damping effect of the preview control is low, the setting unit 86 determines that the preview control is not appropriately executed.

When the unsprung displacement Zu is set to zero with respect to the position where the unsprung displacement map 200 is not present, the proper unsprung displacement Zu indicates that the unsprung displacement Zu is zero for a predetermined period or longer. An inadequate unsprung displacement Zu indicates that the unsprung displacement Zu is zero for a predetermined period or longer. The predetermined time period can be appropriately determined by experiment or simulation.

In addition, when a flag is set for a position where the unsprung displacement map 200 does not exist, the proper unsprung displacement Zu indicates that the flag has not been acquired. An inadequate unsprung displacement Zu indicates that a flag has been acquired.

When the ratio of the component of the second frequency band to the component of the first frequency band derived by the deriving unit 84 is smaller than the predetermined threshold value, the setting unit 86 sets the feedback gain γ of the above Expression (5) to the predetermined reference gain 70. Threshold values can be determined as appropriate by experimentation or simulation.

When the ratio of the component of the second frequency band to the derived component of the first frequency band is equal to or greater than the threshold value, the setting unit 86 sets the feedback gain γ to be smaller than the reference gain 70. Accordingly, when the ratio of the component of the second frequency band to the component of the first frequency band is equal to or greater than the threshold value, deterioration of vibration in the medium-high-frequency band can be suppressed.

In a case where the ratio of the component of the second frequency band to the derived component of the first frequency band is equal to or greater than the threshold value, when the preview control is not appropriately executed, the setting unit 86 sets the feedback gain γ to be larger than when the preview control is appropriately executed.

Specifically, the setting unit 86 sets the feedback gain γ to the predetermined first gain γ1 when the derived ratio is equal to or greater than the threshold value and the preview control is appropriately executed. The first gain γ1 is smaller than the reference gain 70. Since the sprung structure 5 is appropriately damped only by the preview control, the feedback gain γ is made smaller than the reference gain 70.

On the other hand, when the derived ratio is equal to or greater than the threshold value and the preview control is not appropriately executed, the setting unit 86 sets the feedback gain γ to the predetermined second gain γ2. The second gain γ2 is smaller than the reference gain 70 and larger than the first gain γ1. The reference gain 70, the first gain γ1, and the second gain γ2 can be appropriately determined by experiment or simulation. Since the vibration of the sprung structure 5 becomes large when the feedback control is not performed, the feedback gain γ is made larger than the first gain γ1.

When the unsprung displacement Zu of the unsprung displacement map 200 travels at an incorrect location, it is highly likely that the unsprung displacement Zu of the acquired predicted passing position Pf is incorrect. Therefore, the preview control is not appropriately executed. In this case, depending on the preview control, it is highly likely that the input to the sprung structure 5 cannot be sufficiently reduced, but by increasing the feedback gain γ compared to the case where the preview control is appropriately executed, it is possible to suppress the deterioration of the vibration in the low frequency band compared to the case where the first gain γ1 is adopted. Further, since the second gain γ2 is smaller than the reference gain 70, it is possible to suppress the deterioration of the vibration in the medium-high frequency band than in the case where the reference gain 70 is adopted. Therefore, the feedback gain γ can be appropriately adjusted.

If the derived ratio is equal to or greater than the threshold value and the degree of reliability of the unsprung displacement Zu is equal to or less than the reference value, the setting unit 86 may set the feedback gain γ to be larger as the degree of reliability is lower. The feedback gain γ is set in a range smaller than the reference gain 70 and larger than the first gain γ1. As a result, the lower the vibration suppression effect by the preview control, the higher the vibration suppression effect of the low frequency band by the feedback control. Therefore, the feedback gain γ can be appropriately adjusted.

The control unit 90 transmits a control command including the target control force Fc_t to the actuator 3A so that the actuator 3A generates a control force Fc corresponding to the target control force Fc_t calculated according to Expression (5). The actuator 3A generates a control force Fc corresponding to the target control force Fc_t at a timing after the present time by the preview time tp, that is, at a timing at which the wheel 2 passes through the predicted passing position Pf. That is, the control unit 90 controls the actuator 3A so that the control force Fc generated by the actuator 3A when the control object wheel passes through the predicted passing position Pf matches the target control force Fc_t.

As described above, according to the preview control using the unsprung displacement map 200, it is possible to generate the control force Fc that suppresses the vibration of the sprung structure 5 caused by the unsprung displacement Zu of the predicted passing position Pf of the wheel 2 at an appropriate timing. Also, the vibration of the sprung structure 5 can be suppressed by the feedback control. Thus, vibration of the sprung structure 5 can be effectively suppressed.

Figure 5:
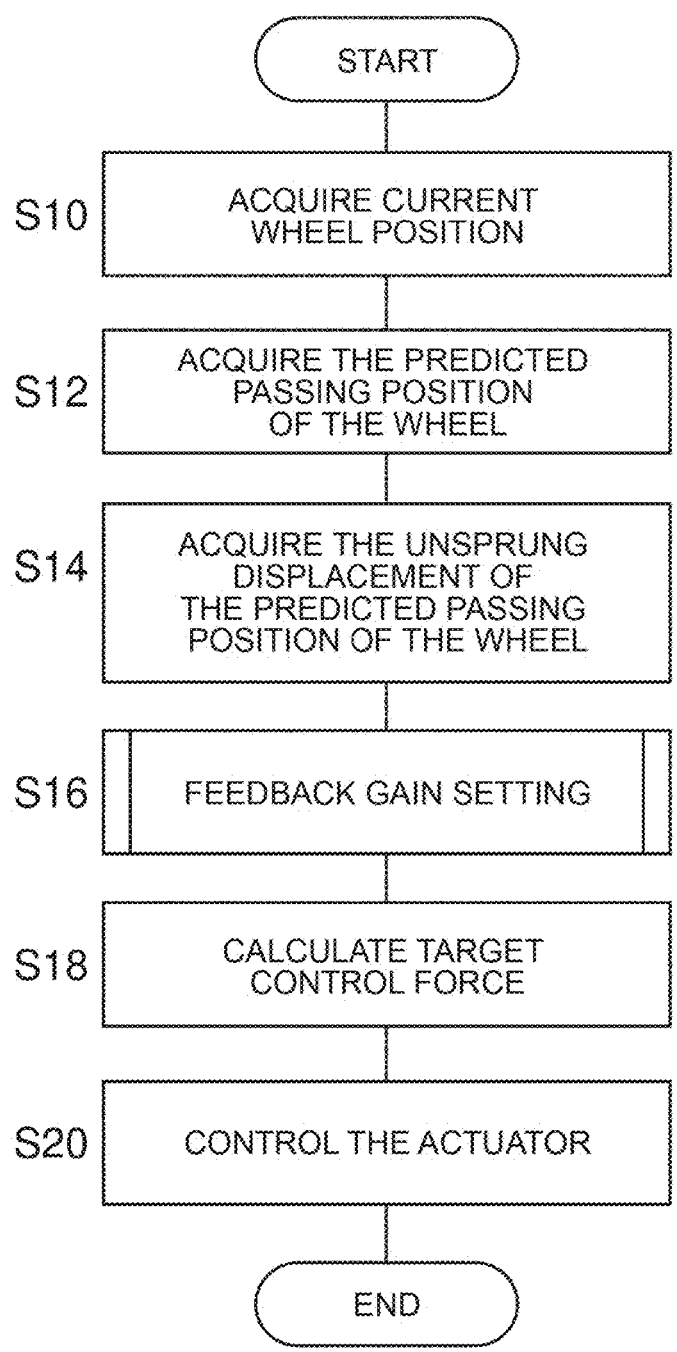
FIG. 5 is a flow chart showing a suspension control process according to the embodiment.

FIG. 5 is a flowchart illustrating a suspension control process according to the embodiment. The process of this flowchart is repeatedly executed for each of the control object wheels at predetermined time steps while the vehicle 1 is traveling.

The first acquisition unit 80 acquires the current position of the wheel 2 (S10), acquires the predicted passing position Pf of the wheel 2 (S12), and acquires the unsprung displacement Zu of the predicted passing position Pf of the wheel 2 from the unsprung displacement map 200 (S14).

ECU 70 executes a feedback gain setting process shown in FIG. 6, which will be described later (S16). The calculation unit 88 calculates the target control force Fc_t according to Expression (5) (S18), and the control unit 90 controls the actuator 3A (S24), and ends the process.

Figure 6:
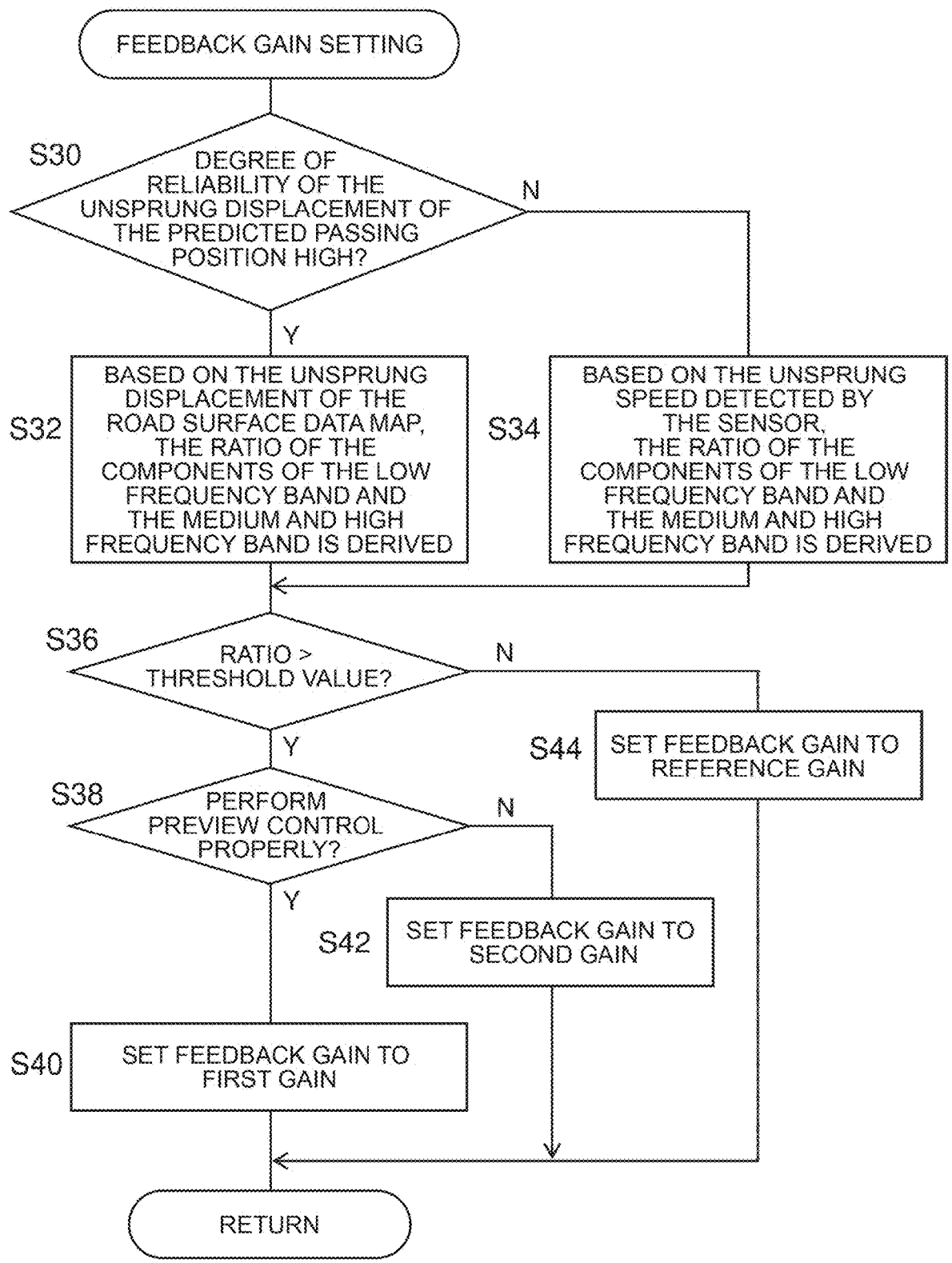
FIG. 6 is a flowchart illustrating the feedback gain setting process of FIG. 5.

FIG. 6 is a flow chart illustrating a feedback gain setting process of S16 of FIG. 5. When the degree of reliability of the unsprung displacement Zu of the predicted passing position Pf is high (Y in S30), the deriving unit 84 derives the ratio of the component of the low-frequency band to the component of the medium-high-frequency band based on the unsprung displacement Zu of the unsprung displacement map 200 (S32), and the process proceeds to S36.

When the degree of reliability of the unsprung displacement Zu of the predicted passing position Pf is low (N in S30), the deriving unit 84 derives the ratio of the low-frequency band component and the medium-high-frequency band component based on the unsprung velocity Zu' detected by the sprung acceleration sensor 22 and the stroke sensor 23 (S34), and the process proceeds to S36.

Next, when the derived ratio is larger than the threshold value (Y in S36), if the preview control is appropriately executed (Y in S38), the setting unit 86 sets the feedback gain γ to the first gain γ1 (S40), and returns to the process of FIG. 5. If the preview control is not properly executed in S38 (N in S38), the setting unit 86 sets the feedback gain γ to the second gain γ2 (S42), and returns to the process of FIG. 5.

In S36, when the derived ratio is equal to or less than the threshold value (N in S36), the setting unit 86 sets the feedback gain γ to the normal gain γ0 (S44), and returns to the process of FIG. 5.

According to the embodiment, when the degree of reliability of the unsprung displacement Zu of the predicted passing position Pf acquired from the unsprung displacement map 200 is higher than the reference value, the ratio of the component of the second frequency band to the component of the first frequency band in the time series data of the unsprung displacement Zu of the predicted passing position Pf is derived, so that the feedback gain γ can be adjusted in advance. Therefore, it is possible to more appropriately suppress the deterioration of vibration in the medium-high-frequency band due to the feedback control.

Further, when the degree of reliability of the unsprung displacement Zu acquired from the unsprung displacement map 200 is equal to or less than the reference value, the ratio of the component of the second frequency band to the component of the first frequency band in the time series data of the unsprung speed Zu' based on the detected values of the sprung acceleration sensor 22 and the stroke sensor 23 is derived, so that a more accurate ratio can be obtained. That is, in a case where the vehicle 1 travels in a place where the unsprung displacement Zu of the unsprung displacement map 200 is incorrect due to a change in the road surface condition due to road construction or the like, in a case where the vehicle 1 travels in an area where the presence or absence of the unsprung displacement Zu of the unsprung displacement map 200 is mixed, in a case where the accuracy of the predicted passing position Pf is also poor due to the poor positional accuracy of the vehicle 1, or the like, it is possible to suppress derivation of an incorrect input ratio based on the unsprung displacement map 200. Therefore, it is possible to suppress erroneous setting of the feedback gain γ.

On the other hand, in the comparative example in which the ratio of the component of the second frequency band to the component of the first frequency band is derived based on the unsprung displacement Zu acquired from the unsprung displacement map 200 at all times, there is a possibility that the feedback gain γ is erroneously adjusted when the vehicle 1 travels at a location where the unsprung displacement Zu of the unsprung displacement map 200 is erroneous.

Further, in the embodiment, when the ratio of the component of the second frequency band to the component of the first frequency band is equal to or greater than the threshold value, the feedback gain γ can be appropriately adjusted according to whether or not the preview control is appropriately executed. Therefore, it is possible to appropriately suppress the vibration deterioration in the medium-high-frequency band due to the feedback control.

The present disclosure has been described above based on the embodiment. It should be understood by those skilled in the art that the embodiment is merely an example, and that various modifications are possible in combination of each component and each process, and that such modifications are within the scope of the present disclosure.

First Modification

It is not necessary to perform a process of changing the frequency-characteristic derivation target according to the degree of reliability of the unsprung displacement Zu of the predicted passing position Pf. That is, in the flow chart of FIG. 6, S30, S32 process may be omitted, and S34 process may be executed first. According to this modification, the feedback gain γ can be appropriately adjusted while simplifying the processing.

Second Modification

The control unit 90 may execute preview control using a known preview sensor instead of preview control using the unsprung displacement map 200 described above. Hereinafter, differences from the embodiments will be mainly described.

The preview sensor (not shown) includes, for example, at least one of a camera sensor, a LiDAR, a radar sensor, and the like. The preview sensor acquires the road surface displacement Zr of the road surface in front of the vehicle 1. In the second modification, it is assumed that the road surface displacement-associated value is the road surface displacement Zr. In the case of generalization, "road surface displacement" in the following description is read as "road surface displacement-associated value". The control force Fc is expressed by the following Expression (6), for example. In this example, the calculation unit 88 calculates the target control force Fc_t according to Expression (6).

$$Fc = \gamma b \cdot Zr + \gamma \cdot Zs \qquad (6)$$

The first term on the right side of Expression (6) is a feedforward term for preview control using a preview sensor. The first term on the right side is the product of the gain yb and the road surface displacement Zr ahead of the vehicle 1 acquired by the preview sensor at the time of calculation of the target control force Fc_t. The gain yb can be appropriately determined by experiment or simulation. Since preview control using a preview sensor is known, further detailed description thereof will be omitted.

The second term on the right side is the same as the second term on the right side of Expression (5), and is a feedback term related to feedback control.

The first acquisition unit 80 acquires the road surface displacement Zr in front of the vehicle 1 from the preview sensor. The deriving unit 84 derives the degree of reliability of the road surface displacement Zr acquired by the first acquisition unit 80. The degree of reliability of the road surface displacement Zr can also be referred to as the degree of reliability of the preview sensor.

For example, the deriving unit 84 derives a high degree of reliability when there is a sufficiently large input with respect to the resolution of the preview sensor, that is, when the detection value of the preview sensor is not zero. The deriving unit 84 derives a low degree of reliability when there is no input sufficiently large with respect to the resolution of the preview sensor, that is, when the detection value of the preview sensor is zero for a predetermined time or longer.

Alternatively, the deriving unit 84 may derive a higher degree of reliability as the surrounding environment of the vehicle 1 is closer to the condition under which the preview sensor functions correctly. For example, the deriving unit 84 may derive a high degree of reliability when the weather is clear, derive a moderate degree of reliability when the weather is cloudy, and derive a low degree of reliability when the weather is rough such as rain or snow. The deriving unit 84 may derive a higher degree of reliability as the illuminance in the vicinity of the road surface increases. The deriving unit 84 may derive a high degree of reliability if the road surface is a detectable road surface, and may derive a low degree of reliability if the road surface is a non-detectable road surface.

When the degree of reliability of the road surface displacement Zr is higher than the reference value, the deriving unit 84 derives a ratio between the component of the first frequency band and the component of the second frequency band in the time series data of the road surface displacement Zr acquired from the preview sensor by the first acquisition unit 80.

When the degree of reliability of the road surface displacement Zr is equal to or lower than the reference value, the deriving unit 84 derives the ratio between the component of the first frequency band and the component of the second frequency band in the time series data of the unsprung velocity Zu' which is the state acquired by the second acquisition unit 82, as in the embodiment.

When the road surface displacement Zr acquired by the first acquisition unit 80 is appropriate or when the degree of reliability of the road surface displacement Zr is higher than the reference value, the setting unit 86 identifies that the preview control is appropriately executed. When the acquired road surface displacement Zr is appropriate and the degree of reliability of the road surface displacement Zr is higher than the reference value, the setting unit 86 may identify that the preview control is appropriately executed.

When the road surface displacement Zr acquired by the first acquisition unit 80 is not appropriate, or when the degree of reliability of the road surface displacement Zr is equal to or less than the reference value, the setting unit 86 identifies that the preview control is not appropriately executed.

When the road surface displacement Zr is appropriate, the fact that the road surface displacement Zr is zero indicates that the road surface displacement has not continued for a predetermined period or longer. The inappropriate road surface displacement Zr indicates that the road surface displacement Zr is zero and lasts for a predetermined period or longer.

The setting of the feedback gain γ in Expression (6) by the setting unit 86 is the same as that in the embodiment.

According to the second modification, when the degree of reliability of the road surface displacement Zr acquired from the preview sensor is equal to or less than the reference value, the ratio of the component of the first frequency band and the component of the second frequency band in the time series data of the unsprung speed Zu' based on the detected values of the sprung acceleration sensor 22 and the stroke sensor 23 is derived, so that a more accurate ratio can be obtained. That is, in a case where there is a high possibility that the detection value of the preview sensor is erroneous, such as a case where the surrounding environment of the vehicle 1 does not match the condition under which the preview sensor functions correctly, it is possible to suppress derivation of an erroneous input ratio based on the detection value of the preview sensor. Therefore, it is possible to suppress erroneous setting of the feedback gain γ. Other effects similar to those of the embodiment can also be obtained.

Note that the first modification and the second modification may be combined.

Further, in the embodiment, the preview control is performed for four wheels 2 of the vehicle 1, that is, all wheels. However, the control object wheels, which are the wheels to be subjected to the preview control, are not limited to all the wheels, and may be, for example, only the left and right front wheels or only the left and right rear wheels.

What is claimed is:

1. A suspension control system comprising:
an actuator that adjusts a suspension stroke of a control object wheel of a vehicle; and
a control device for controlling the actuator, wherein the control device includes
a first acquisition unit that acquires a road surface displacement-associated value that is related to up-down direction displacement of a road surface forward of the vehicle,
a second acquisition unit that acquires a state related to up-down direction displacement of a sprung structure or an unsprung structure of the vehicle,
a deriving unit that derives, in time series data of the road surface displacement-associated value or the state that is acquired, a ratio between a magnitude of a component of a predetermined first frequency band and a magnitude of a component of a predetermined second frequency band that is higher than the first frequency band,
a control unit that, by controlling the actuator, executes feedforward control for reducing vibrations of the sprung structure based on the road surface displacement-associated value that is acquired, and also executes feedback control for reducing vibrations of the sprung structure based on the state that is acquired, and
a setting unit that, when the ratio that is derived is no lower than a threshold value, and also when the feedforward control is not being appropriately executed, sets feedback gain of the feedback control to be greater than when the feedforward control is being appropriately executed.

2. The suspension control system according to claim 1, wherein the setting unit sets the feedback gain to a reference gain when the ratio that is derived is lower than the threshold value, and sets the feedback gain to be smaller than the reference gain when the ratio that is derived is no lower than the threshold value.

3. The suspension control system according to claim 1, wherein the setting unit
identifies feedforward control as being appropriately executed when the road surface displacement-associated value that is acquired is appropriate, or when a degree of reliability of the road surface displacement-associated value that is acquired is higher than a reference value, and
identifies feedforward control as not being appropriately executed when the road surface displacement-associated value that is acquired is not appropriate, or when the degree of reliability is no higher than the reference value.

4. The suspension control system according to claim 1, wherein the deriving unit
derives the ratio in the time series data of the road surface displacement-associated value when a degree of reliability of the road surface displacement-associated value that is acquired is higher than a reference value, and
derives the ratio of the state that is acquired in the time series data when the degree of reliability is no higher than the reference value.

5. The suspension control system according to claim 3, wherein, when the ratio that is derived is no lower than the threshold value, and also when the degree of reliability is no higher than the reference value, the setting unit sets the feedback gain to be greater the lower the degree of reliability is.

* * * * *